(12) United States Patent
Akamatsu et al.

(10) Patent No.: US 11,279,855 B2
(45) Date of Patent: Mar. 22, 2022

(54) ELECTRICALLY PEELABLE ADHESIVE COMPOSITION, ADHESIVE SHEET, AND JOINED BODY

(71) Applicant: NITTO DENKO CORPORATION, Ibaraki (JP)

(72) Inventors: Kaori Akamatsu, Ibaraki (JP); Shigeki Ishiguro, Ibaraki (JP); Yoshiko Ogino, Ibaraki (JP); Atsushi Takashima, Ibaraki (JP); Aya Nagatomo, Ibaraki (JP); Kaori Mizobata, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 15/768,786

(22) PCT Filed: Aug. 17, 2016

(86) PCT No.: PCT/JP2016/074022
§ 371 (c)(1),
(2) Date: Apr. 16, 2018

(87) PCT Pub. No.: WO2017/064918
PCT Pub. Date: Apr. 20, 2017

(65) Prior Publication Data
US 2018/0305593 A1    Oct. 25, 2018

(30) Foreign Application Priority Data
Oct. 16, 2015  (JP) .............................. JP2015-204998

(51) Int. Cl.
*C09J 7/10* (2018.01)
*C09J 11/06* (2006.01)
(Continued)

(52) U.S. Cl.
CPC ................... *C09J 7/10* (2018.01); *C08K 5/19* (2013.01); *C08K 5/372* (2013.01); *C08K 5/50* (2013.01);
(Continued)

(58) Field of Classification Search
None
See application file for complete search history.

(56) References Cited

U.S. PATENT DOCUMENTS 5,814,685 A * 9/1998 Satake ................. C09D 11/326
523/201
7,070,051 B2 * 7/2006 Kanner ............ A61B 17/06133
206/382

(Continued)

FOREIGN PATENT DOCUMENTS

CN     101238191 A    8/2008
EP     1 914 285 A1   4/2008
(Continued)

OTHER PUBLICATIONS

Aldrich Data Sheet (Year: 2019).*
(Continued)

*Primary Examiner* — Frank D Ducheneaux
(74) *Attorney, Agent, or Firm* — Hauptman Ham, LLP

(57) ABSTRACT

There is provided an electrically peelable adhesive composition that is for forming an adhesive layer which has high adhesion and can be easily peeled off by applying a voltage for a short time even at a low voltage. In addition, there is provided an adhesive sheet including an adhesive layer formed of the composition that has high adhesion and can be easily peeled off by applying a voltage for a short time even at a low voltage, and a joined body of the adhesive sheet and an adherend. The electrically peelable adhesive composition of the invention includes a polymer and an ionic liquid, in which an anion of the ionic liquid is a bis(fluorosulfonyl)

(Continued)

imide anion. A content of the ionic liquid is preferably 0.5 to 30 parts by weight with respect to 100 parts by weight of the polymer.

15 Claims, 1 Drawing Sheet

(51) Int. Cl.
```
C09J 133/06    (2006.01)
C09J 5/00      (2006.01)
C09J 9/02      (2006.01)
C09J 133/08    (2006.01)
C09J 133/10    (2006.01)
C08K 5/19      (2006.01)
C08K 5/372     (2006.01)
C08K 5/50      (2006.01)
C08K 5/34      (2006.01)
C08K 5/42      (2006.01)
C08K 5/00      (2006.01)
```

(52) U.S. Cl.
CPC . *C09J 5/00* (2013.01); *C09J 9/02* (2013.01); *C09J 11/06* (2013.01); *C09J 133/06* (2013.01); *C09J 133/08* (2013.01); *C09J 133/10* (2013.01); *C08K 5/0075* (2013.01); *C08K 5/34* (2013.01); *C08K 5/42* (2013.01); *C09J 2203/326* (2013.01); *C09J 2203/33* (2013.01); *C09J 2301/408* (2020.08); *C09J 2301/502* (2020.08); *C09J 2433/00* (2013.01)

(56) References Cited

U.S. PATENT DOCUMENTS

| | | | | |
|---|---|---|---|---|
| 2008/0248299 | A1* | 10/2008 | Kuwahara | C09J 133/04 428/355 R |
| 2009/0035580 | A1  | 2/2009  | Chino et al. | |
| 2014/0248490 | A1  | 9/2014  | Morimoto et al. | |
| 2014/0308516 | A1  | 10/2014 | Yonezaki et al. | |
| 2014/0342152 | A1* | 11/2014 | Amano | C09J 11/04 428/355 AC |
| 2015/0093533 | A1* | 4/2015  | Kim | C09J 7/385 428/41.5 |
| 2015/0099114 | A1* | 4/2015  | Kim | G02B 1/16 428/355 CN |

FOREIGN PATENT DOCUMENTS

| | | |
|---|---|---|
| EP | 2158077 B1 | 8/2014 |
| JP | 2009-155585 A | 7/2009 |
| JP | 2010-037355 A | 2/2010 |
| JP | 2011-037929 A | 2/2011 |
| WO | 2007018239 A1 | 2/2007 |
| WO | 2008150228 A1 | 12/2008 |
| WO | WO-2013058186 A1 * | 4/2013 ............. C09J 11/04 |

OTHER PUBLICATIONS

Machine translation of JP 2010037355 A (Year: 2010).*
The extended European Search Report for corresponding European application No. 18197333.0 dated Dec. 13, 2018.
International Search Report for corresponding international application PCT/JP2016/074022 dated Nov. 1, 2016.
The extended European search report for corresponding European application No. 16855172.9 dated Jun. 12, 2019.
Chinese Office Action dated Apr. 24, 2019 for corresponding Chinese Application No. 201680060579.8.
U.S. Office Action dated May 2, 2019 for corresponding U.S. Appl. No. 16/146,395.
Chinese Office Action dated Mar. 3, 2020 corresponding to Chinese Application No. 201680060579.8, with English Translation.
U.S. Office Action dated Dec. 20, 2019 for corresponding U.S. Appl. No. 16/146,395.
Chinese Office Action dated Apr. 22, 2020 corresponding to Chinese Application No. 201811141232.3, with English translation.
Office Action issued for corresponding Japanese Patent Application No. 2017-545109 dated Jun. 1, 2021, along with an English machine translation.
Decision of Rejection issued for corresponding Chinese Patent Application No. 201680060579.8 dated Jan. 13, 2021, along with an English translation.
Office Action issued for corresponding Japanese Patent Application No. 2017-545109 dated Aug. 4, 2020, along with an English translation.
Office Action issued for corresponding Chinese Patent Application No. 201680060579.8 dated Sep. 30, 2020, along with an English translation.
Communication pursuant to Article 94(3) EPC issued for corresponding European Patent Application No. 16855172.9 dated Jul. 16, 2021.
"Thermische Analyse UserCom 18", Feb. 1, 2003, pp. 1-20 [http://de.mt.com/global/de/home/supportive_content/usercom/TA_UserCom18.z2vUzxjPy0vKAxrVCMLHBfbHCI45nZa0nG-.TA_UserCom18.MediaFileComponent.html/tauserc18d.pdf] (retrieved May 4, 2010), along with a partial English translation, cited in NPL No. 1.

* cited by examiner

ELECTRICALLY PEELABLE ADHESIVE COMPOSITION, ADHESIVE SHEET, AND JOINED BODY

CROSS REFERENCE TO RELATED APPLICATIONS

This application claims the priority of Japanese Patent Application No. 2015-204998, filed on Oct. 16, 2015, in the Japanese Patent Office. Further, this application is the National Phase application of International Application No. PCT/JP2016/074022 filed on Aug. 17, 2016, which is incorporated herein by reference in its entirety.

TECHNICAL FIELD

The present invention relates to an electrically peelable adhesive composition that includes a polymer and an ionic liquid and is for forming an adhesive layer of which an adhesive force is lowered simply by applying a voltage and which can be easily peeled off from an adherend, an adhesive sheet that includes the adhesive layer formed of the composition, and a joined body of the adhesive sheet and an adherend.

BACKGROUND ART

There is an increasing demand for rework for improving yield in a manufacturing process of an electronic component or recycle for disassembling and recovering components after use. In such applications, there is a demand for providing an adhesive sheet having both high adhesion corresponding to a purpose of use and ease of peeling (peelability) at the time of reworking and recycling.

As the adhesive sheet for realizing the adhesion and the peelability, an adhesive sheet in PTL 1 that uses an ionic liquid for the adhesive and is peeled off by applying a voltage is known. The ionic liquid includes cations and anions, and has properties such as nonvolatility, heat resistance, incombustibility, and chemical stability. PTL 1 discloses that it is considered that peeling is easily performed since when a voltage is applied, electrolysis of the ionic liquid occurs, reduction occurs in a cathode side by moving of cations, oxidation occurs in an anode side by moving of anions, and thereby weakening an adhesive interface ([0018]). In PTL 1, peeling is performed by using a polymer, as an adhesive, such as a urethane prepolymer and epoxy resin or an ionic liquid and applying a voltage for 1 to 5 minutes at a voltage of 20 to 100 V.

CITATION LIST

Patent Literature

[PTL 1] WO2007/018239

SUMMARY OF INVENTION

Technical Problem

However, in PTL 1, there are problems that an adhesion force at the time of normal use without application of a voltage is not sufficient, it is necessary to apply a high voltage for a long time for peeling, and in particular, in rework in a manufacturing process of an electronic component or recycling for disassembling and recovering components after use, it is not possible to satisfy demands for peeling quickly and performing peeling with good workability. In addition, due to the application of high voltage, there is also a concern about an influence on an electronic component that is an adherend, and there is also a problem of electric shock to a worker. Further, also in an ionic liquid to be used, it is strongly demanded that peeling is possible by applying a voltage for a short time at a low voltage without inhibiting an adhesion force at the time of normal use and it is more suitable for rework and recycling.

Accordingly, an object of the present invention is to provide an electrically peelable adhesive composition that is for forming an adhesive layer that has high adhesion and can be easily peeled off by applying a voltage for a short time even at a low voltage. In addition, another object of the present invention is to provide an adhesive sheet including an adhesive layer formed of the composition that has high adhesion and can be easily peeled off by applying a voltage for a short time even at a low voltage, and a joined body of the adhesive sheet and an adherend.

Solution to Problem

As a result of intensive investigations to solve the above problems, the present inventors have found that when using a composition including a polymer and a specific ionic liquid, peeling can be easily performed by applying a voltage while having high adhesion. The present invention has been accomplished based on these finding.

That is, the present invention provides an electrically peelable adhesive composition including a polymer and an ionic liquid, in which an anion of the ionic liquid is a bis(fluorosulfonyl)imide anion.

In addition, in the present invention, it is preferable that a content of the ionic liquid is 0.5 to 30 parts by weight with respect to 100 parts by weight of polymer.

In addition, in the present invention, it is preferable that a glass transition temperature of the polymer is 0° C. or lower.

In addition, in the present invention, it is preferable that the polymer is an acrylic polymer.

In addition, in the present invention, it is preferable that the acrylic polymer has a monomer unit derived from an alkyl (meth)acrylate having an alkyl group having 1 to 14 carbon atoms.

In addition, in the present invention, it is preferable that the acrylic polymer has a monomer unit derived from alkyl (meth)acrylate having an alkyl group having 1 to 14 carbon atoms and a monomer unit derived from a polar group-containing monomer.

In addition, in the present invention, it is preferable that the polar group-containing monomer is a carboxyl group-containing monomer.

In addition, in the present invention, it is preferable that the alkyl (meth)acrylate having an alkyl group having 1 to 14 carbon atoms is butyl (meth)acrylate.

In addition, in the present invention, it is preferable that at least one selected from the group consisting of a nitrogen-containing onium cation, a sulfur-containing onium cation, and a phosphorus-containing onium cation is contained as a cation of the ionic liquid.

In addition, in the present invention, it is preferable that at least one cation selected from Formulas (2-A) to (2-D) below is contained as a cation of the ionic liquid.

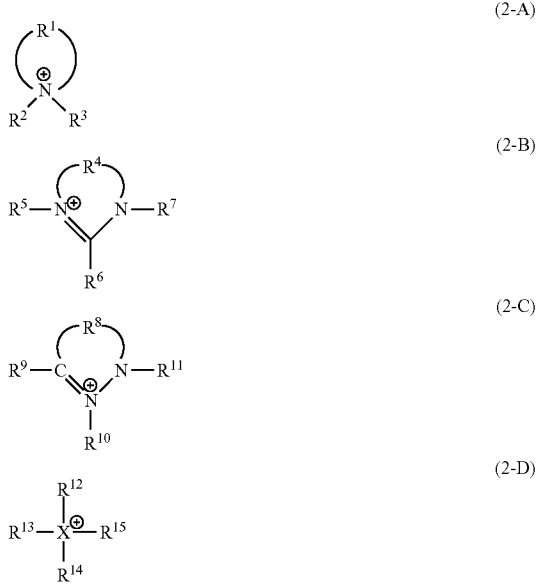

(In Formula (2-A), $R^1$ represents a hydrocarbon group having 4 to 10 carbon atoms and may contain a hetero atom, and $R^2$ and $R^3$ are the same as or different from each other, represent a hydrogen atom or a hydrocarbon group having 1 to 12 carbon atoms, and may also contain a hetero atom. Where, in a case where a nitrogen atom forms a double bond with an adjacent carbon atom, there is no $R^3$. In Formula (2-B), $R^4$ represents a hydrocarbon group having 2 to 10 carbon atoms and may contain a hetero atom, and $R^5$, $R^6$, and $R^7$ are the same as or different from each other, represent a hydrogen atom or a hydrocarbon group having 1 to 12 carbon atoms, and may contain a hetero atom. In Formula (2-C), $R^8$ represents a hydrocarbon group having 2 to 10 carbon atoms and may contain a hetero atom, and $R^9$, $R^{10}$, and $R^{11}$ are the same as or different from each other, represent a hydrogen atom or a hydrocarbon group having 1 to 16 carbon atoms, and may contain a hetero atom. In Formula (2-D), X represents a nitrogen atom, a sulfur atom, or a phosphorus atom, and $R^{12}$, $R^{13}$, $R^{14}$, and $R^{15}$ are the same as or different from each other, represent a hydrocarbon group having 1 to 16 carbon atoms, and may contain a hetero atom. Where, in a case where X is a sulfur atom, there is no $R^{12}$).

In addition, in the present invention, it is preferable that a molecular weight of the cation of the ionic liquid is 250 or less.

In addition, the present invention provides an adhesive sheet including an adhesive layer that is formed of the electrically peelable adhesive composition.

In addition, in the present invention, it is preferable that the adhesive layer has a thickness of 1 μm or more and 1000 μm or less.

In addition, in the present invention, it is preferable that the adhesive sheet is a double-sided adhesive sheet not including a substrate layer.

In addition, the present invention provides a joined body having at least a laminate structure including a conductive adherend and the adhesive sheet.

In addition, the present invention preferably has a laminate structure including one conductive adherend, the adhesive sheet, and the other conductive adherend.

Advantageous Effects of Invention

According to an adhesive layer that is formed of an electrically peelable adhesive composition of the present invention, it is possible to form an adhesive layer that has high adhesion and can be easily peeled off by applying a voltage or applying a voltage after adding water. In particular, peeling does not occur in normal use and it is possible to perform peeling in a short time by applying a low voltage. In addition, since peeling can be performed by applying a low voltage, it is possible to perform peeling by simple device with good workability without requiring an expensive device. The adhesive sheet of the present invention has high adhesion and can be easily peeled off by applying a voltage regardless of a type of adherend.

DESCRIPTION OF EMBODIMENTS

[Electrically Peelable Adhesive Composition]

Figure 1:
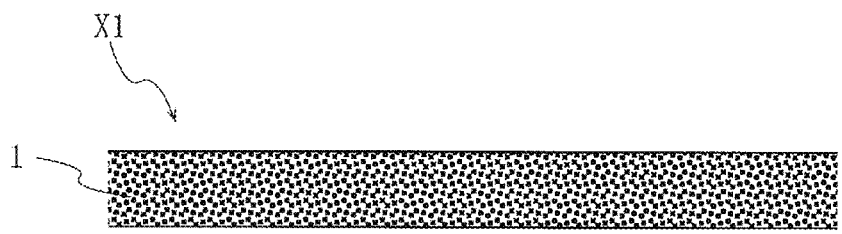
FIG. 1 is a sectional view showing an example of the adhesive sheet of the present invention.

An electrically peelable adhesive composition of the present invention (hereinafter, referred to as "the present invention" in some cases) includes a polymer and an ionic liquid, in which an anion of the ionic liquid is a bis (fluorosulfonyl)imide anion. The present invention is a composition for forming an adhesive layer, and may include as needed, a crosslinking agent, polyethylene glycol, a conductive filler, an additive (such as plasticizer and filler).

(Polymer)

The polymer in the present invention is not particularly limited as long as it is a common organic polymer compound, and examples thereof include a polymerized product or a partially polymerized product of monomers. The monomers may be one kind of monomers and also be a monomer mixture of two or more kinds of monomers. The partially polymerized product means a polymerized product in which one or more components of the monomer or the monomer mixture are partially polymerized.

The polymer is not particularly limited as long as the polymer is used as a general adhesive, and has adhesion, and examples thereof include an acrylic polymer, a rubber-based polymer, a vinyl alkyl ether-based polymer, a silicone-based polymer, a polyester-based polymer, a polyamide-based polymer, a urethane-based polymer, a fluorine-based polymer, and an epoxy-based polymer. In particular, from a viewpoint of costs or productivity, it is preferable that the polymer is an acrylic polymer. In the present invention, an acrylic electrically-peelable adhesive composition including an acrylic polymer as a polymer is preferable. The polymer can be used alone or two or more kinds thereof can be used in combination.

The acrylic polymer is not particularly limited, and preferably has a monomer unit derived from alkyl (meth) acrylate (the following Formula (1)) having an alkyl group having 1 to 14 carbon atoms.

$$CH_2=C(R^a)COOR^b \qquad (1)$$

(In Formula (1), $R^a$ is a hydrogen atom or a methyl group, and $R^b$ is an alkyl group having 1 to 14 carbon atoms).

Examples of the alkyl (meth)acrylate having an alkyl group having 1 to 14 carbon atoms include methyl (meth)acrylate, ethyl (meth)acrylate, propyl (meth)acrylate, isopropyl (meth)acrylate, n-butyl (meth)acrylate, sec-butyl (meth)acrylate, 1,3-dimethylbutyl acrylate, pentyl (meth)acrylate, isopentyl (meth)acrylate, hexyl (meth)acrylate, 2-ethyl butyl (meth)acrylate, heptyl (meth)acrylate, n-octyl (meth)acrylate, isooctyl (meth)acrylate, 2-ethylhexyl (meth)acrylate, n-nonyl (meth)acrylate, isononyl (meth)acrylate, n-decyl (meth)acrylate, isodecyl (meth)acrylate, n-dodecyl (meth)acrylate, n-tridecyl (meth)acrylate, and n-tetradecyl (meth)acrylate. Among these, n-butyl acrylate, 2-ethylhexyl acrylate, and isononyl acrylate are preferable. The alkyl (meth)acrylate having an alkyl group having 1 to 14 carbon atoms can be used alone or two or more kinds thereof can be used in combination.

A proportion of the alkyl (meth)acrylate having an alkyl group having 1 to 14 carbon atoms with respect to total monomer components (100% by weight) forming the acrylic polymer is not particularly limited, but is preferably 70% by weight or more, more preferably 80% by weight or more, and further preferably 85% by weight or more. In a case where the proportion is 70% by weight or more, it becomes easy to further improve adhesiveness to the adherend when the adhesive layer is formed.

As the acrylic polymer, in order to modify cohesive force, heat resistance, cross-linking property, and the like, it is preferable to include, in addition to a monomer unit derived from the alkyl (meth)acrylate having an alkyl group having 1 to 14 carbon atoms, a monomer unit derived from a polar group-containing monomer that can be copolymerized with the monomer unit derived from the alkyl (meth)acrylate.

Examples of the polar group-containing monomer include a hydroxyl group-containing monomer, a carboxyl group-containing monomer, a cyano group-containing monomer, a vinyl ether monomer, an aromatic vinyl monomer, an amide group-containing monomer, a imide group-containing monomer, an amino group-containing monomer, an epoxy group-containing monomer, a vinyl group-containing monomer, an N-acryloyl morpholine, a sulfo group-containing monomer, a phosphate group-containing monomer, and an acid anhydride group-containing monomer. In particular, from the viewpoint of excellent cohesiveness, a hydroxyl group-containing monomer, a carboxyl group-containing monomer, and an amide group-containing monomer are preferable. The polar group-containing monomers can be used alone, and two or more kinds thereof can be used in combination.

The hydroxyl group-containing monomer is not particularly limited, and examples thereof include 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, (4-hydroxymethylcyclohexyl)methyl (meth)acrylate, N-methylol (meth)acrylamide, vinyl alcohol, allyl alcohol, 2-hydroxyethyl vinyl ether, 4-hydroxybutyl vinyl ether, and diethylene glycol monovinyl ether. In particular, 2-hydroxyethyl (meth)acrylate and 4-hydroxybutyl (meth)acrylate are preferable. The hydroxyl group-containing monomers can be used alone and two or more kinds thereof can be used in combination.

Examples of the carboxyl group-containing monomer include acrylic acid, methacrylic acid, carboxyethyl (meth)acrylate, carboxypentyl (meth)acrylate, itaconic acid, maleic acid, fumaric acid, crotonic acid, and isocrotonic acid. In particular, acrylic acid is preferable. The carboxyl group-containing monomer can be used alone and two or more kinds thereof can be used in combination.

Examples of the amide group-containing monomer include acrylamide, methacrylamide, N-vinyl pyrrolidone, N,N-dimethylacrylamide, N,N-dimethyl methacrylamide, N,N-diethylacrylamide, N,N-diethyl methacrylamide, N,N'-methylenebisacrylamide, N,N-dimethylaminopropyl acrylamide, N,N-dimethylaminopropyl methacrylamide, and diacetone acrylamide. The amide group-containing monomer can be used alone and two or more kinds thereof can be used in combination.

Examples of the cyano group-containing monomer include acrylonitrile and methacrylonitrile.

Examples of the vinyl group-containing monomer include vinyl esters such as vinyl acetate, vinyl propionate, and vinyl laurate. In particular, vinyl acetate is preferable.

Examples of the aromatic vinyl monomer include styrene, chlorostyrene, chloromethylstyrene, α-methylstyrene, and other substituted styrene.

Examples of the imide group-containing monomer include cyclohexyl maleimide, isopropyl maleimide, N-cyclohexyl maleimide, and itaconimide.

Examples of the amino group-containing monomer include aminoethyl (meta)acrylate, N,N-dimethylaminoethyl (meth)acrylate, and N,N-dimethylaminopropyl (meth)acrylate.

Examples of the epoxy group-containing monomer include glycidyl (meth)acrylate, methylglycidyl (meth)acrylate, and allyl glycidyl ether.

Examples of the vinyl ether monomer include methyl vinyl ether, ethyl vinyl ether, and isobutyl vinyl ether.

As the polar group-containing monomer, among these described above, acrylic acid, 2-hydroxyethyl (meth)acrylate, and vinyl acetate are preferable, and it is particularly preferable to use these in combination.

A proportion of the polar group-containing monomer with respect to total monomer components (100% by weight) forming the acrylic polymer is not particularly limited, but is preferably 0.1% by weight or more and 30% by weight or less. An upper limit of the proportion of the polar group-containing monomer is more preferably 25% by weight, further preferably 20% by weight, and particularly preferably 15% by weight. A lower limit thereof is more preferably 0.5% by weight, further preferably 1% by weight, and particularly preferably 2% by weight. When the proportion of the polar group-containing monomer is 0.1% by weight or more, a cohesive force is easily obtained. Therefore, adhesive residue hardly occurs on a surface of an adherend after peeling off the adhesive layer, and effects of wettability and adhesion of the surface of the adherend after peeling is performed are easily obtained. In addition, when the proportion of the polar group-containing monomer is 30% by weight or less, it becomes easy to prevent the adhesive layer from excessively adhering to the adherend and becoming a heavy peel type. In particular, when the proportion is 2% by weight or more and 15% by weight or less, it becomes easy to achieve both peelability of the adhesive layer and adhesion between the surface of the adherend and another layer.

In addition, as the monomer component forming the acrylic polymer, a polyfunctional monomer may be included, from the viewpoint of easily obtaining a necessary cohesive force by introducing a crosslinked structure into the acrylic polymer.

The polyfunctional monomer is not particularly limited, and examples thereof include ethylene glycol di(meth)acrylate, diethylene glycol di(meth)acrylate, tetraethylene glycol di(meth)acrylate, neopentyl glycol di(meth)acrylate, 1,6-hexanediol di(meth)acrylate, trimethylolpropane tri(meth)acrylate, pentaerythritol tri(meth)acrylate, dipentaerythritol hexa(meth)acrylate, divinylbenzene, and N,N'-methylene bisacrylamide. The polyfunctional monomer can be used alone and two or more kinds thereof can be used in combination.

A content of the polyfunctional monomer with respect to total monomer components (100 parts by weight) forming the acrylic polymer is not particularly limited, but is preferably 0.1 parts by weight or more and 15 parts by weight or less. An upper limit of the content of the polyfunctional monomer is more preferably 10 parts by weight, and a lower limit thereof is more preferably 3 parts by weight. When the content of the polyfunctional monomer is 0.1 parts by weight or more, it is preferable that flexibility and adhesion of the adhesive layer are easily improved. When the content of the polyfunctional monomer is 15 parts by weight or less, a cohesive force does not become too high, and appropriate adhesion is easily obtained.

The polymer according to the present invention can be obtained by (co)polymerizing the monomer components. The polymerization method is not particularly limited, and examples thereof include solution polymerization, emulsion polymerization, bulk polymerization, suspension polymerization, and photopolymerization (active energy ray polymerization) methods. In particular, the solution polymerization method is preferable, from the viewpoint of cost or productivity. When the polymer is copolymerized, the polymer may be any of a random copolymer, a block copolymer, an alternating copolymer, and a graft copolymer.

The solution polymerization method is not particularly limited, and examples thereof include a method in which a monomer component, polymerization initiator, and the like are dissolved in a solvent, heated, and polymerized to obtain a polymer solution containing a polymer.

As the solvent used in the solution polymerization method, various common solvents can be used. These solvents (polymerization solvent) are not particularly limited, and examples thereof include organic solvents such as: aromatic hydrocarbons such as toluene, benzene, and xylene; esters such as ethyl acetate and n-butyl acetate; aliphatic hydrocarbons such as n-hexane and n-heptane; cycloaliphatic hydrocarbons such as cyclohexane and methylcyclohexane; and ketones such as methyl ethyl ketone and methyl isobutyl ketone. The solvent can be used alone and two or more kinds thereof can be used in combination.

A content of the solvent is not particularly limited, but it is preferably 10 parts by weight or more and 1000 parts by weight or less with respect to total monomer components (100 parts by weight) forming the polymer. An upper limit of the content of the solvent is more preferably 500 parts by weight and the lower limit thereof is more preferably 50 parts by weight.

The polymerization initiator used in the solution polymerization method is not particularly limited, but examples thereof include a peroxide-based polymerization initiator and an azo-based polymerization initiator. The peroxide-based polymerization initiator is not particularly limited, but examples thereof include peroxycarbonate, ketone peroxide, peroxy ketal, hydroperoxide, dialkyl peroxide, diacyl peroxide, peroxy esters, and more specifically include benzoyl peroxide, t-butyl hydroperoxide, di-t-butyl peroxide, t-butyl peroxybenzoate, dicumyl peroxide, 1,1-bis(t-butylperoxy)-3,3,5-trimethylcyclohexane, and 1,1-bis(t-butylperoxy)cyclododecane. The azo-based polymerization initiator is not particularly limited, but examples thereof include 2,2'-azobisisobutyronitrile, 2,2'-azobis-2-methylbutyronitrile, 2,2'-azobis(2,4-dimethylvaleronitrile), 2,2'-azobis(2-methylpropionic acid)dimethyl, 2,2'-azobis(4-methoxy-2,4-dimethylvaleronitrile), 1,1'-azobis(cyclohexane-1-carbonitrile), 2,2'-azobis(2,4,4-trimethylpentane), 4,4'-azobis-4-cyanovaleric acid, 2,2'-azobis(2-amidinopropane) dihydrochloride, 2,2'-azobis[2-(5-methyl-2-imidazolin-2-yl)propane] dihydrochloride, 2,2'-azobis(2-methylpropionamidine) disulfate, 2,2'-azobis (N,N'-dimethyleneisobutylamidine) hydrochloride, 2,2'-azobis[N-(2-carboxyethyl)-2-methylpropionamidine] hydrate. The polymerization initiator can be used alone and two or more kinds thereof can be used in combination.

A content of the polymerization initiator is not particularly limited, but is preferably 0.01 parts by weight or more and 5 parts by weight or less, with respect to total monomer components (100 parts by weight) forming the polymer (particularly, the acrylic polymer). An upper limit of the content of the polymerization initiator is more preferably 3 parts by weight. In addition, a lower limit of the content of the polymerization initiator is more preferably 0.05 parts by weight.

A heating temperature at the time of polymerization by heating in the solution polymerization method is not particularly limited, but examples thereof include 50° C. or higher and 80° C. or lower. The heating time is not particularly limited, but examples thereof include 1 hour or longer and 24 hours or shorter.

A weight average molecular weight of the polymer (particularly, the acrylic polymer) is not particularly limited, but is preferably 100000 or larger and 5000000 or smaller. An upper limit of the weight average molecular weight is more preferably 4000000 and further preferably 3000000, and lower limit thereof is more preferably 200000 and further preferably 300000. When the weight average molecular weight is larger than 100000, it is possible to suppress disadvantages that the cohesive force becomes small, adhesive residue occurs on the surface of the adherend after peeling off the adhesive layer, and effects of wettability and adhesion of the surface of the adherend after peeling is performed are not obtained. In addition, when the weight average molecular weight is smaller than 5000000, it is possible to suppress a disadvantage that wettability of the surface of the adherend after peeling off the adhesive layer becomes insufficient.

The weight average molecular weight is measured by gel permeation chromatography (GPC) method to be obtained. More specifically, for example, the weight average molecular weight can be measured using "HLC-8220GPC" (trade name, manufactured by Tosoh Corporation) as a GPC measuring device, under the following conditions and calculated from a standard polystyrene conversion value.

(Conditions for Measuring Molecular Weight)
  Sample concentration: 0.2% by weight (tetrahydrofuran solution)
  Sample injection amount: 10 μL
  Sample column: TSK guard column Super HZ-H (1 piece)+TSK gel Super HZM-H (2 pieces)
  Reference column: TSK gel Super H-RC (1 piece)
  Eluent: tetrahydrofuran (THF)
  Flow rate: 0.6 mL/min
  Detector: differential refractometer (RI)
  Column temperature (measurement temperature): 40° C.

A glass transition temperature (Tg) of the polymer (particularly, the acrylic polymer) is not particularly limited, but is preferably 0° C. or lower, more preferably −10° C. or lower, further preferably −20° C. or lower, particularly preferably −40° C. or lower, and most preferably −50° C. or lower. When the glass transition temperature is 0° C. or lower, it is possible to suppress a decrease in an initial adhesion force.

The glass transition temperature (Tg) can be calculated, for example, based on the following Formula (Y) (Fox formula).

$$1/Tg = W1/Tg1 + W2/Tg2 + \ldots + Wn/Tgn \quad (Y)$$

[In formula (Y), Tg represents a glass transition temperature (unit: K) of the polymer, Tgi (i=1, 2, . . . n) represents a glass transition temperature (unit: K) of the polymer when a monomer i forms a homopolymer, and Wi (i=1, 2, . . . n) represents a weight fraction in the total monomer components of the monomer i]

Formula (Y) is a calculation formula in a case where the polymer is formed of n kinds (monomer 1, monomer 2, . . . , and monomer n) of monomer components.

The glass transition temperature when the homopolymer is formed means a glass transition temperature of a homopolymer of the monomer and means a glass transition temperature (Tg) of a polymer that is formed of only certain monomers (referred to as "monomer X" in some cases) as monomer components. Specifically, numerical values are exemplified in "Polymer Handbook" (Third Edition, John Wiley & Sons, Inc, 1989). The glass transition temperature (Tg) of a homopolymer not described in the above-described literature is, for example, a value obtained by the following measuring method. That is, 100 parts by weight of the monomer X, 0.2 parts by weight of 2,2'-azobisisobutyronitrile, and 200 parts by weight of ethyl acetate as a polymerization solvent are put into a reactor including a thermometer, a stirrer, a nitrogen inlet tube, and a reflux cooling tube, and are stirred for 1 hour while introducing nitrogen gas. In this manner, oxygen in a polymerization system is removed, and then, a temperature is raised to 63° C. and a reaction is performed for 10 hours. Next, the temperature is cooled to a room temperature to obtain a homopolymer solution having a solid concentration of 33% by weight. Next, the homopolymer solution is applied on a release liner by a flow casing, and dried to prepare a test sample (sheet-like homopolymer) having a thickness of approximately 2 mm. Then, approximately 1 to 2 mg of the test sample is weighed into an open cell made of aluminum to obtain an operation of reversing heat flow (specific heat component) of the homo polymer using a temperature-modulated DSC (trade name "Q-2000" manufactured by TA Instruments) at a temperature rising rate of 5° C./min under 50 ml/min of a nitrogen atmosphere. With reference to JIS-K-7121, a temperature at the point where a straight line equidistant in a vertical axis direction from straight lines, which are obtained by extending a baseline on a high temperature side and a baseline on the low temperature side of the obtained reversing heat flow, intersects with a curve of a portion in which the glass transition changes stepwise is set as the glass transition temperature (Tg) when forming the homopolymer.

A content of the polymer in the present invention is not particularly limited, but is preferably 50% by weight or more and 99.9% by weight or less, with respect to the total amount (100% by weight) of the adhesive composition. An upper limit thereof is more preferably 99.5% by weight and further preferably 99% by weight. A lower limit thereof is more preferably 60% by weight and further preferably 70% by weight.

(Ionic Liquid)

The ionic liquid is, in general, a molten salt that is liquid at a room temperature (approximately 25° C.) and is also called an ordinary temperature molten salt. In the present invention, at least one ionic liquid in which an anion is a bis(fluorosulfonyl)imide anion (hereinafter, also referred to as "FSI" in some cases) is included. The FSI in the ionic liquid is an anion represented by the following formula.

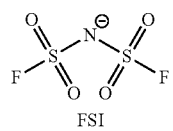

FSI

A cation in the ionic liquid is not particularly limited, but is preferable to have a small molecular weight, from a viewpoint of excellent peelability when applying a voltage. The molecular weight of the cation is, for example, 250 or smaller (50 to 250), preferably 230 or smaller, more preferably 200 or smaller, further preferably 180 or smaller, and particularly preferably 160 or smaller. In the present invention, when using a cation having a molecular weight of 160 or smaller, good peelability can be obtained even without adding water when applying a voltage.

In the present invention, it is considered that, by using the ionic liquid for the electrically peelable adhesive composition, in a thickness direction of the adhesive layer formed of the composition, mainly the cations move toward a cathode side when applying a voltage, to be biased in the vicinity of the interface between the adhesive layer and the adherend, thereby occurring the peelability. In the present invention, it is considered that, particularly in a case of using the cation having a molecular weight of 160 or smaller, a movement of cations toward the cathode side in the adhesive layer becomes easier, thereby easily obtaining particularly good peelability. It is considered that in a case of applying a voltage while adding water, the water is present at the interface between the adhesive layer and the adherend, thereby promoting the movement of the cations toward the cathode side.

The cation in the ionic liquid is not particularly limited, but is preferably a nitrogen-containing onium cation, a sulfur-containing onium cation, or a phosphorus-containing onium cation, and more preferably an imidazolium-based cation, an ammonium-based cation, or a pyridinium-based cation. In addition, as the cation, cations represented by the following Formulas (2-A) to (2-D) are also preferable.

(2-A)

(2-B)

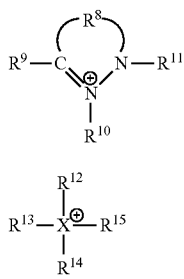 (2-C)

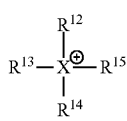 (2-D)

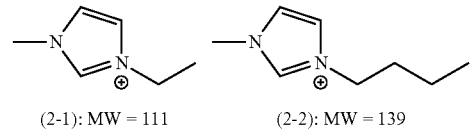

(2-1): MW = 111    (2-2): MW = 139

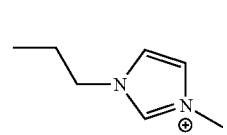

(2-3): MW = 125    (2-4): MW = 136

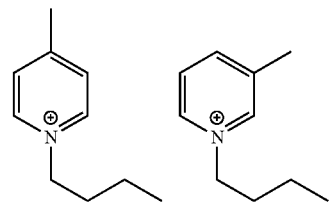

(2-5): MW = 150    (2-6): MW = 150

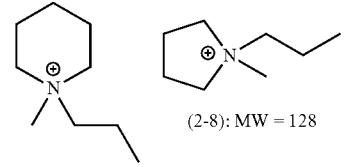

(2-7): MW = 142    (2-8): MW = 128

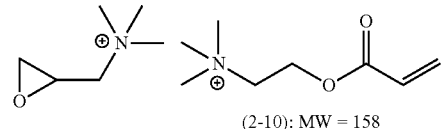

(2-9): MW = 116    (2-10): MW = 158

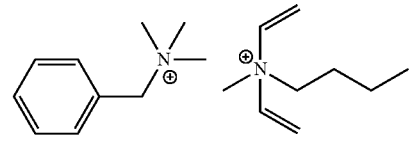

(2-11): MW = 150    (2-12): MW = 140

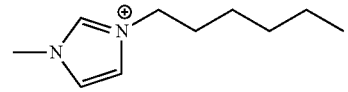

(2-13): MW = 168

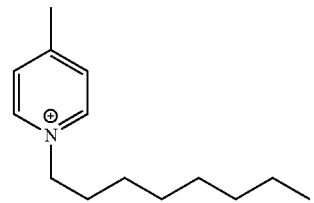

(2-14): MW = 209

In Formula (2-A), $R^1$ represents a hydrocarbon group having 4 to 10 carbon atoms (preferably a hydrocarbon group having 4 to 8 carbon atoms and more preferably a hydrocarbon group having 4 to 6 carbon atoms) and may also contain a hetero atom, $R^2$ and $R^3$ are the same as or different from each other, represent a hydrogen atom or a hydrocarbon group having 1 to 12 carbon atoms (preferably a hydrocarbon group having 1 to 8 carbon atoms, more preferably a hydrocarbon group having 2 to 6 carbon atoms, and further preferably a hydrocarbon group having 2 to 4 carbon atoms), and may also contain a hetero atom. Where, in a case where a nitrogen atom forms a double bond with an adjacent carbon atom, there is no $R^3$.

In Formula (2-B), $R^4$ represents a hydrocarbon group having 2 to 10 carbon atoms (preferably a hydrocarbon group having 2 to 8 carbon atoms and more preferably a hydrocarbon group having 2 to 6 carbon atoms) and may contain a hetero atom, and $R^5$, $R^6$, and $R^7$ are the same as or different from each other, represent a hydrogen atom or a hydrocarbon group having 1 to 12 carbon atoms (preferably a hydrocarbon group having 1 to 8 carbon atoms, more preferably a hydrocarbon group having 2 to 6 carbon atoms, and further preferably a hydrocarbon group having 2 to 4 carbon atoms), and may also contain a hetero atom.

In Formula (2-C), $R^8$ represents a hydrocarbon group having 2 to 10 carbon atoms (preferably a hydrocarbon group having 2 to 8 carbon atoms and more preferably a hydrocarbon group having 2 to 6 carbon atoms) and may also contain a hetero atom, and $R^9$, $R^{10}$, and $R^{11}$ are the same as or different from each other, represent a hydrogen atom or a hydrocarbon group having 1 to 16 carbon atoms (preferably a hydrocarbon group having 1 to 10 carbon atoms and more preferably a hydrocarbon group having 1 to 8 carbon atoms), and may also contain a hetero atom.

In Formula (2-D), X represents a nitrogen atom, a sulfur atom, or a phosphorus atom, and $R^{12}$, $R^{13}$, $R^{14}$, and $R^{15}$ are the same as or different from each other, represent a hydrocarbon group having 1 to 16 carbon atoms (preferably a hydrocarbon group having 1 to 14 carbon atoms, more preferably a hydrocarbon group having 1 to 10 carbon atoms, further preferably a hydrocarbon group having 1 to 8 carbon atoms, and particularly preferably a hydrocarbon group having 1 to 6 carbon atoms), and may also contain a hetero atom. Where, in a case where X is a sulfur atom, there is no $R^{12}$.

As the cation, cations represented by the following Formulas (2-1) to (2-14) are preferable. MW in lower portion of each formula is a molecular weight. The ionic liquid can be used alone and two or more kinds thereof can be used in combination.

An ionic conductivity of the ionic liquid is not particularly limited, but is preferably 0.1 mS/cm or more and 10 mS/cm or less. An upper limit of the ionic conductivity is more preferably 5 mS/cm and further preferably 3 mS/cm, and a lower limit thereof is more preferably 0.3 mS/cm and further preferably 0.5 mS/cm. By having the ionic conductivity within the ranges, sufficient peelability can be obtained even at a low voltage. The ionic conductivity can be measured by an AC impedance method, for example, using a 1260 frequency response analyzer (manufactured by Solartron Analytical).

As a commercially available product of the ionic liquid, "ELEXCEL AS-110", "ELEXCEL MP-442", "ELEXCEL IL-210", "ELEXCEL MP-471", and "ELEXCEL AS-804" (trade names, which are manufactured by DKS Co. Ltd.), and "HMI-FSI" (trade name, manufactured by Mitsubishi Materials Corporation) can be used.

A content (mixing amount) of the ionic liquid is not particularly limited, but is preferably 0.5 parts by weight or more and 30 parts by weight or less with respect to 100 parts by weight of the polymer. An upper limit of the ionic liquid is more preferably 20 parts by weight, further preferably 15 parts by weight, particularly preferably 10 parts by weight, and most preferably 5 parts by weight. A lower limit thereof is more preferably 0.6 parts by weight, further preferably 0.8 parts by weight, particularly preferably 1.0 parts by weight, and most preferably 1.5 parts by weight. When the content of the ionic liquid is less than 0.5 parts by weight, it becomes difficult to obtain peelability even in a current carrying state. When the content of the ionic liquid is more than 30 parts by weight, there is concern that further peelability cannot be obtained and adhesiveness when not applying a voltage (in normal) decreases.

(Crosslinking Agent)

In the present invention, a crosslinking agent may be included, as needed, in order to improve creeping property or shearing property by crosslinking the polymers. Examples of the crosslinking agent include an isocyanate-based crosslinking agent, an epoxy-based crosslinking agent, a melamine-based crosslinking agent, a peroxide-based crosslinking agent, a urea-based crosslinking agent, a metal alkoxide-based crosslinking agent, a metal chelate-based crosslinking agent, a metal salt-based crosslinking agent, a carbodiimide-based crosslinking agent, an oxazoline-based crosslinking agent, an aziridine-based crosslinking agent, and an amine-based crosslinking agent. Examples of the isocyanate-based crosslinking agent include toluene diisocyanate and methylene bisphenyl isocyanate. Examples of the epoxy-based crosslinking agent include N,N,N',N'-tetraglycidyl-m-xylenediamine, diglycidylaniline, 1,3-bis (N,N-diglycidylaminomethyl) cyclohexane, and 1,6-hexanediol diglycidyl ether. A content of the crosslinking agent is preferably 0.1 parts by weight or more and 50 parts by weight or less with respect to 100 parts by weight of the polymer. The crosslinking agent can be used alone and two or more kinds thereof can be used in combination.

(Polyethylene Glycol)

In the present invention, polyethylene glycol may be included, as needed, in order to assist the movement of the ionic liquid when applying a voltage. As the polyethylene glycol, polyethylene glycol having a number average molecular weight of 200 to 6000 can be used. A content of the polyethylene glycol is preferably 0.1 parts by weight or more and 30 parts by weight or less with respect to 100 parts by weight of the polymer.

(Conductive Filler)

In the present invention, a conductive filler may be included, as needed, in order to impart conductivity to the adhesive layer. The conductive filler is not particularly limited, and a commonly known or commonly used conductive filler can be used. For example, graphite, carbon black, carbon fiber, metal powder such as silver and copper can be used. A content of the conductive filler is preferably 0.1 parts by weight or more and 200 parts by weight or less with respect to 100 parts by weight of the polymer.

(Additives)

In the present invention, as needed, within a range of not impairing effects of the present invention, various additives such as a filler, plasticizer, an antioxidant, an anti-aging agent, a pigment (a dye), flame retardant, solvent, surfactant (leveling agent), rust inhibitor, tackifying resin, and an antistatic agent can be included in addition to the crosslinking agent, polyethylene glycol, and the conductive filler. The additives can be used alone and two or more kinds thereof can be used in combination.

Examples of the filler include silica, iron oxide, zinc oxide, aluminum oxide, titanium oxide, barium oxide, magnesium oxide, calcium carbonate, magnesium carbonate, zinc carbonate, agalmatolite clay, kaolin clay, and calcined clay.

As the plasticizer, known and customary plasticizers used for a common resin composition can be used, and examples thereof include oil such as paraffin oil and process oil, liquid rubber such as liquid polyisoprene, liquid polybutadiene, and liquid ethylene-propylene rubber, tetrahydrophthalic acid, azelaic acid, benzoic acid, phthalic acid, trimellitic acid, pyromellitic acid, adipic acid, sebacic acid, fumaric acid, maleic acid, itaconic acid, and citric acid, and derivatives thereof, dioctyl phthalate (DOP), dibutyl phthalate (DBP), dioctyl adipate, diisononyl adipate (DINA), and isodecyl succinate.

Examples of the anti-aging agent include hindered phenol-based or aliphatic and aromatic hindered amine-based compound. Examples of the antioxidant include butylhydroxytoluene (BHT) and butylhydroxyanisole (BHA). Examples of the pigment include an inorganic pigment such as titanium dioxide, zinc oxide, ultramarine blue, indian red, lithopone, lead, cadmium, iron, cobalt, aluminum, hydrochloride, and sulfate, and an organic pigment such as an azo pigment and a copper phthalocyanine pigment. Examples of the rust inhibitor include zinc phosphate, tannic acid derivative, phosphate, basic sulfonate, and various rust preventive pigments. Examples of the adhesion-imparting agent include a titanium coupling agent and zirconium coupling agent. Examples of the antistatic agent include, in general, a quarternary ammonium salt or a hydrophilic compound such as polyglycolic acid and ethylene oxide derivative.

Examples of the tackifying resin include polyamide-based tackifying resin, epoxy-based tackifying resin, and elastomer-based tackifier resin, in addition to rosin-based tackifying resin, terpene-based tackifying resins, phenolic-based tackifying resin, hydrocarbon-based tackifying resin, and ketone-based tackifying resin. The tackifying resin can be used alone and two or more kinds thereof can be used in combination.

A content (mixing amount) of the additive is not particularly limited, but is preferably 0 parts by weight or more and 20 parts by weight or less, with respect to 100 parts by weight of the polymer. An upper limit of the additive is more preferably 10 parts by weight and further preferably 5 parts by weight.

(Manufacturing Method of Electrically Peelable Adhesive Composition)

The electrically peelable adhesive composition of the present invention is not particularly limited, can be manufactured by appropriately stirring and mixing the polymer and the ionic liquid, and as needed, the crosslinking agent, polyethylene glycol, a conductive filler, an additive, and the like are blended therewith.

[Adhesive Sheet]

The adhesive sheet of the present invention is not particularly limited as long as the adhesive sheet includes at least one layer of the adhesive layer (first adhesive layer including an ionic liquid) (hereinafter, referred to as "adhesive layer of the present invention" in some cases) formed of the electrically peelable adhesive composition of the present invention described above, and in addition to the adhesive layer, may include a substrate, a conductive layer, a conduction substrate, and an adhesive layer (second adhesive layer not including an ionic liquid) (hereinafter, referred to as "other adhesive layer" in some cases) other than the adhesive layer of the present invention. Only one layer of the other adhesive layer may be provided, or two or more layers of the other adhesive layers may also be provided. In addition, within a range of not impairing effects of the present invention, an intermediate layer, an undercoat layer, and the like may be included. The adhesive sheet of the present invention may have, for example, a form in which the adhesive sheet is wound in a roll shape or a sheet-like form. The "adhesive sheet" also includes meaning of an "adhesive tape". That is, the adhesive sheet of the present invention may be an adhesive tape having a tape-like form.

The adhesive sheet of the present invention may be a double-sided adhesive sheet (having no substrate) which does not include a substrate, is only formed of the adhesive layers of the present invention, and does not include a substrate layer, may be a double-sided adhesive sheet which has a substrate, and in which both faces of the sheet are adhesive layers (adhesive layer of the present invention or other adhesive layer), and may also be a single-sided adhesive sheet which has a substrate, and in which only single side of the sheet is an adhesive layer (adhesive layer of the present invention or other adhesive layer). In the present invention, a separator (release liner) may be included in order to protect the surface of the adhesive layer, but the separator is not included in the adhesive sheet.

Figure 2:
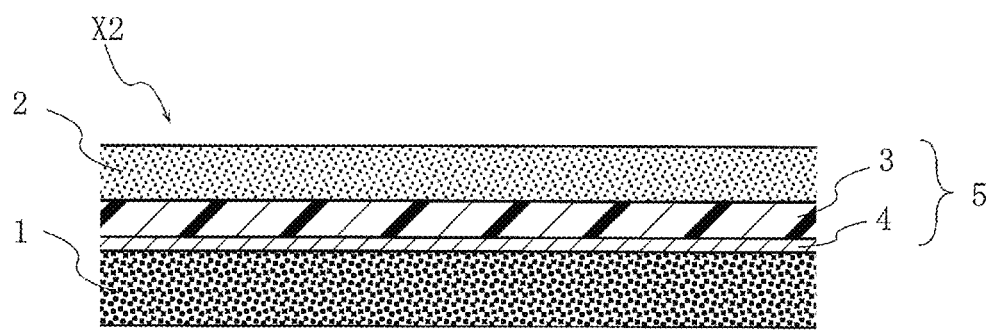
FIG. 2 is a sectional view showing an example of a laminate structure of the adhesive sheet of the present invention.
Figure 3:
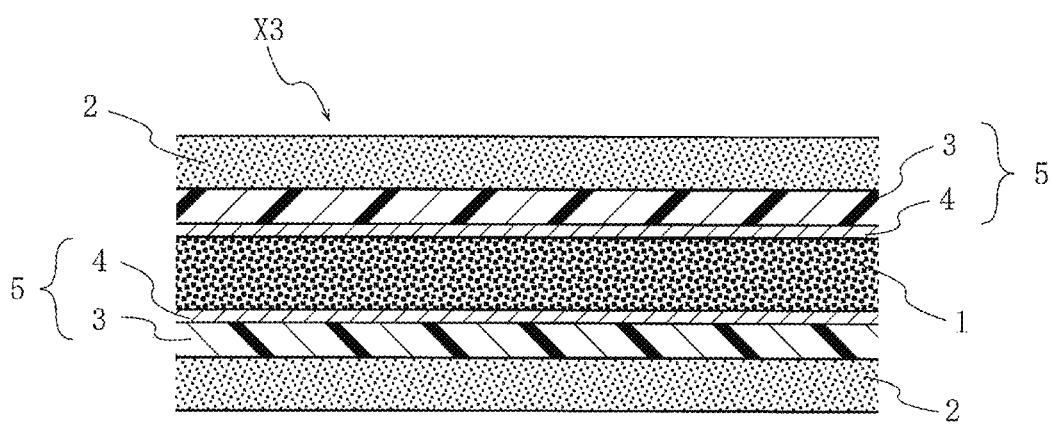
FIG. 3 is a sectional view showing another example of a laminate structure of the adhesive sheet of the present invention.

The adhesive sheet of the present invention is not particularly limited, preferred examples thereof include an adhesive sheet X1 shown in FIG. 1, an adhesive sheet X2 showing a laminate structure in FIG. 2, and an adhesive sheet X3 showing a laminate structure in FIG. 3. In FIGS. 1 to 3, the adhesive layer 1 is the adhesive layer of the present invention and the adhesive layer 2 shows other adhesive layer (second adhesive layer not including an ionic liquid). The adhesive sheet X1 shown in FIG. 1 is a double-sided adhesive sheet that only includes the adhesive layer 1 and has no substrate. The adhesive sheet X2 showing the laminate structure in FIG. 2 is a double-sided adhesive sheet that has a layer configuration of adhesive layer 2, a conduction substrate 5 (substrate 3 and conductive layer 4), and the adhesive layer 1, and has the substrate. The adhesive sheet X3 showing the laminate structure in FIG. 3 is a double-sided adhesive sheet having a substrate, which has a layer configuration of adhesive layer 2, a conduction substrate 5 (substrate 3 and conductive layer 4), adhesive layer 1, a conduction substrate 5 (substrate 3 and conductive layer 4), and adhesive layer 2. In FIGS. 2 and 3, the substrate 3 is not essential and there may be only the conductive layer 4. In addition, in FIG. 2, there may be a single-sided adhesive sheet which is not provided with the adhesive layer 2.

The substrate (substrate 3) is not particularly limited, but examples thereof include a paper base substrate such as paper, a fiber base substrate such as cloth and nonwoven fabric, a plastic substrate such as a film or a sheet made of various plastics (polyolefin-based resin such as polyethylene and polypropylene, polyester-based resin such as polyethylene terephthalate, acrylic resin such as polymethyl methacrylate, and the like), and a laminate thereof. The substrate may have a form of a single layer and may also have a form of multi-layers. The substrate may be subjected to, as needed, various treatments such as a back-face treatment, an antistatic treatment, and an undercoating treatment.

The conductive layer (conductive layer 4) is not particularly limited, as long as it is a layer having conductivity, and examples thereof include a metal base substrate such as metal (for example, aluminum, copper, iron, tin, and gold) foil and a metal plate (for example, aluminum, copper, iron, tin, and silver), a conductive polymer, and laminate of the various plastics and the metal base substrate.

The conduction substrate (conduction substrate 5) is not particularly limited, as long as it is a substrate having a conductive layer (carrying a current), but examples thereof include a substrate in which a metal layer is formed on a surface of the substrate described above. For example, there is a substrate in which a metal layer is formed on a surface of the substrate exemplified for the substrate 3 by a method such as a plating method, a chemical vapor deposition method, and sputtering. Examples of the metal layer include metal, a metal plate, and a conductive polymer which are exemplified for the conductive layer.

In the adhesive sheet X1, it is preferable that the adherends on both sides of the adhesive layer 1 are conductive adherends. In the adhesive sheet X2, it is preferable that an adherend on an adhesive layer 1 side is a conductive adherend and an adherend on an adhesive layer 2 side is a non-conductive adherend. In addition, in the adhesive sheet X3, it is preferable that the adherends on both sides of the adhesive layer 2 are the non-conductive adherends. The conductive adherend is not particularly limited, as long as it has conductivity, but examples thereof include a sheet-like metal (for example, mainly formed of aluminum, copper, iron, tin, gold, silver, and lead) component and plate. The non-conductive adherend is not particularly limited as long as it has no conductivity, but examples thereof include a fiber base sheet such as paper, cloth, and nonwoven fabric and film or a sheet of various plastics.

In the adhesive sheet of the present invention, it is preferable that at least one adherend is the non-conductive adherend. In addition, in the adhesive sheet of the present invention, it is preferable that at least one adherend is the non-conductive adherend, and the adhesive sheet has a laminate structure including a second adhesive layer not including an ionic liquid, the conductive layer, and the first adhesive layer containing the ionic liquid in order. In addition, it is preferable that the adhesive sheet of the present invention is a double-sided adhesive sheet having a laminate structure including the first adhesive layer which includes the ionic liquid, a second adhesive layer not including an ionic liquid, and the conductive layer for applying a voltage which is disposed between the first adhesive layer and the second adhesive layer and is electrically connected to the first adhesive layer. In addition, it is preferable that the laminate structure includes the substrate for supporting the conductive layer (is the conduction substrate). Further, it is preferable that the adhesive sheet of the present invention is a double-sided adhesive sheet having a laminate structure including the first adhesive layer, the second adhesive layer, a pair of a first conductive layer and a second conductive layer which are disposed between the first adhesive layer and the second adhesive layer and are for applying a voltage, and a third adhesive layer which is disposed between the first adhesive layer and the second adhesive layer, is electrically connected to the first and second adhesive layers, and includes an ionic liquid. The pair of the first conductive layer and the second conductive layer for applying a voltage are all the conductive layers, and the first conductive layer and the second conductive layer may be the same as or different from each other. The third adhesive layer including an ionic liquid is the adhesive layer of the present invention and may be the same as or different from the first adhesive layer.

A thickness of the adhesive layer (first adhesive layer; adhesive layer 1) of the present invention is not particularly limited, but is preferably 1 μm or larger and 1000 μm or smaller, from the viewpoint of adhesiveness when not applying a voltage (in normal). An upper limit of the thickness is more preferably 500 μm, further preferably 100 μm, and particularly preferably 30 μm, and lower limit thereof is more preferably 3 μm, further preferably 5 μm, and particularly preferably 8 μm. In a case where the adhesive sheet is a double-sided adhesive sheet having no substrate (adhesive sheet X1 shown in FIG. 1) only including one adhesive layer, the thickness of the adhesive layer 1 is a thickness of the adhesive sheet.

A thickness of another adhesive layer (second adhesive layer; adhesive layer 2) is not particularly limited, but is preferably 1 μm or larger and 2000 μm or smaller, from the viewpoint of adhesiveness. An upper limit of the thickness is more preferably 1000 μm, further preferably 500 μm, and particularly preferably 100 μm, and a lower limit thereof is more preferably 3 μm, further preferably 5 μm, and particularly preferably 8 μm.

A thickness of the substrate (substrate 3) is not particularly limited, but is preferably 50 μm or larger and 1000 μm or smaller. The upper limit of the thickness is more preferably 500 μm and further preferably 300 μm, and the lower limit thereof is more preferably 80 μm and further preferably 100 μm.

A thickness of the conductive layer (conductive layer 4) is not particularly limited, but is preferably 10 μm or larger and 1000 μm or smaller. An upper limit of the thickness is more preferably 500 μm and further preferably 300 μm, and a lower limit thereof is more preferably 30 μm and further preferably 50 μm.

A thickness of the conduction substrate (conduction substrate 5) is not particularly limited, but is preferably 50 μm or larger and 1000 μm or smaller. An upper limit of the thickness is more preferably 500 μm and further preferably 300 μm, and a lower limit thereof is more preferably 80 μm and further preferably 100 μm.

The surface of the adhesive sheet of the present invention may be protected by a separator (release liner). The separator is not particularly limited, but examples thereof include a release liner formed by silicone-treating a surface of a substrate (liner substrate) of paper, plastic film, and the like, and a release liner formed by laminating polyolefin-based resin on a surface of a substrate (liner substrate) of paper, plastic film, and the like. A thickness of the separator is not particularly limited, but is preferably 10 μm or larger and 100 μm or smaller.

A thickness of the adhesive sheet of the present invention is not particularly limited, but is preferably 20 μm or larger and 3000 μm or smaller. An upper limit of the thickness is more preferably 1000 μm, further preferably 300 μm, and particularly preferably 200 μm, and a lower limit thereof is more preferably 30 μm, further preferably 50 μm, and particularly preferably 70 μm.

In particular, in a case where the adhesive sheet is the adhesive sheet X2 shown in FIG. 2, the thickness of the adhesive sheet is not particularly limited, but is preferably 50 μm or larger and 2000 μm or smaller. An upper limit of the thickness is more preferably 1000 μm and further preferably 200 μm, and a lower limit thereof is more preferably 80 μm and further preferably 100 μm.

In particular, in a case where the adhesive sheet is the adhesive sheet X3 shown in FIG. 3, the thickness of the adhesive sheet is not particularly limited, but is preferably 100 μm or larger and 3000 μm or smaller. An upper limit of the thickness is more preferably 1000 μm and further preferably 300 μm, and a lower limit thereof is more preferably 150 μm and further preferably 200 μm.

An adhesion force (initial adhesion force) of the adhesive layer (first adhesive layer) of the present invention when not applying a voltage (in normal) is not particularly limited, but is preferably 0.1 or more and 40 or less, as an adhesion force in 180° peel test (tension rate: 300 mm/min). An upper limit of the adhesion force is more preferably 20, further preferably 10, and particularly preferably 5, and a lower limit thereof is more preferably 0.3, further preferably 0.5, and particularly preferably 0.8. When the adhesion force is less than 0.1, the adhesion force may not be sufficient and peeling may occur. When the adhesion force exceeds 40, peeling may not be possible even when applying a voltage. A unit of the adhesion force is N/cm. The initial adhesion force is an adhesion force in a case where the adhesive sheet is attached to the adherend (SUS304), is pressed by reciprocating a 2 kg roller one time, and after standing for 30 minutes, is subjected to 180° peeling using a peeling tester.

(Manufacturing Method of Adhesive Sheet)

As the manufacturing method of the adhesive layer of the adhesive sheet, a known or customary manufacturing method can be used. For example, for the adhesive layer (first adhesive layer) of the present invention, a method in which a solution in which the electrically peelable adhesive composition of the present invention including the polymer and the ionic liquid is dissolved in a solvent as needed is applied on the separator and dried and/or cured may be used. In addition, for another adhesive layer (second adhesive layer), a method in which a solution in which the adhesive composition not including the ionic liquid is dissolved in a solvent as needed is applied on the separator and dried and/or cured may be used. As the solvent and the separator, the above described examples can be used.

When performing application, a common coater (for example, a gravure roll coater, a reverse roll coater, a kiss roll coater, a dip roll coater, a bar coater, a knife coater, and a spray roll coater) can be used.

The adhesive layer (first adhesive layer) of the present invention and another adhesive layer (second adhesive layer) can be manufactured by the method, and the adhesive sheet of the present invention can be manufactured by appropriately laminating the adhesive layer (first adhesive layer) of the present invention and another adhesive layer (second adhesive layer) on the substrate, the conductive layer, and the conduction substrate. The adhesive sheet may be manufactured by applying the adhesive composition by using the substrate, the conductive layer, and the conduction substrate, instead of the separator.

(Electrically Peeling Method for Adhesive Sheet)

Peeling of the adhesive sheet of the present invention from an adherend can be performed by generating a potential difference in a thickness direction of the adhesive layer (first adhesive layer) by applying a voltage (carrying a voltage) to the adhesive layer (first adhesive layer) of the present invention. For example, in a case where the adherends on both faces of the adhesive sheet X1 is the conductive adherends, a current is carried to the conductive adherends on both sides and a voltage is applied to the adhesive layer 1, thereby being possible to perform peeling. In a case where the adherend on the adhesive layer 1 side in the adhesive sheet X2 is the conductive adherend, a current is carried to the conductive adherend and the conductive layer 4 and a voltage is applied to the adhesive layer 1, thereby being possible to perform the peeling. In a case of the adhesive sheet X3, a current is carried to the conductive layers 4 on both sides and a voltage is applied to the adhesive layer 1, thereby being possible to perform the peeling. It is preferable to perform the current-carrying by connecting terminals to one end and the other end of the adhesive sheet such that a voltage is applied to the entire adhesive layer (first adhesive layer) of the present invention. The one end and the other end may be a part of the conductive adherend, in a case where the adherend is a conductive adherend. When the adhesive sheet is peeled off from the adherend, a voltage may be applied (current may be carried) to the adhesive layer (first adhesive layer) while adding water.

A voltage to be applied is not particularly limited as long as the adhesive sheet can be peeled off, but is preferably 1 V or higher and 100 V or lower. An upper limit of the voltage is more preferably 50 V, further preferably 30 V, and particularly preferably 15 V, and a lower limit thereof is more preferably 3 V and further preferably 6 V. An application time is not particularly limited, as long as peeling is possible, but is preferably 1 second or longer and 60 seconds or shorter, from the viewpoint of workability. An upper limit of the application time is more preferably 40 seconds and further preferably 20 seconds. The adhesive sheet of the present invention can be peeled off even at a lower voltage than that of the related art. A peeling operation is possible even in a simple device using a battery as a power supply. In addition, the application time is also shorter than that of the related art and the peeling workability is excellent.

Electrical peeling of the adhesive sheet is not particularly limited, but peeling is preferably performed within 60 seconds after stopping the voltage, and more preferably performed within 30 seconds. When the time exceeds 60 seconds, the adhesion force of the adhesive sheet recovers and the peeling may not be performed. In addition, in the adhesive sheet of the present invention, since the peeling of the adhesive sheet is possible even at a low voltage (10 V or lower), peeling can be performed while applying a voltage.

The adhesion force of the adhesive layer (first adhesive layer) of the present invention after applying a voltage (10 seconds after stopping the voltage) is not particularly limited, but is preferably 1.0 or less, more preferably 0.5 or less, further preferably 0.3 or less, and particularly preferably 0.1, as an adhesion force in 180° peel test (tension rate: 300 mm/min). When the adhesion force exceeds 1.0, peeling may not be peeled off from the adherend. A unit of the adhesion force is N/cm. The adhesion force is an adhesion force in a case where the adhesive sheet is attached to the adherend (SUS304), is pressed by reciprocating a 2 kg roller one time, and after standing for 30 minutes, is subjected to 180° peeling using a peeling tester after applying 10 V of a voltage for 30 seconds and after 10 seconds from stopping the voltage.

An adhesion force recovery rate of the adhesive sheet after applying a voltage [(Adhesion force of the adhesive sheet after applying a voltage (after 10 seconds from stopping the voltage)/The initial adhesion force)×100] is not particularly limited, but is preferably 20% or less, more preferably 10% or less, further preferably 5% or less, and particularly preferably 3% or less. The adhesion force recovery rate is a recovery rate after 10 seconds from stopping the voltage. When the adhesion force recovery rate exceeds 20%, the adhesive force recovers in a short time (for example, 3 seconds) from stopping the voltage even when the peelability is good when applying a voltage or immediately after the application, and peeling operation becomes impossible. Therefore, it is preferable that the adhesion force recovery rate after 10 seconds from stopping the voltage is as small as possible.

[Joined Body]

The joined body of the present invention is a laminated structure body of the adhesive sheet of the present invention and an adherend. Examples of the adherend include the conductive adherend and non-conductive adherend.

Examples of the joined body of the present invention include the adhesive sheet X1 which is a joined body in which adherends on both sides of the adhesive layer 1 are the conductive adherends, the adhesive sheet X2 which is a joined body in which an adherend on the adhesive layer 1 side is the conductive adherend and an adherend on the adhesive layer 2 side is the non-conductive adherend, and the adhesive sheet X3 which is joined body in which adherends on both sides of the adhesive layer 2 are the non-conductive adherends. The joined body of the present invention preferably has at least a laminate structure including the conductive adherend and the adhesive sheet of the present invention, and more preferably has a laminate structure including one conductive adherend, the adhesive sheet of the present invention, and the other conductive adherend.

EXAMPLES

Hereinafter, the present invention will be more specifically described by Examples; however, the present invention is not limited by these Examples. A weight average molecular weights in Synthesis Examples 1 to 5 are measured using a gel permeation chromatograph (GPC) method by the above-described method. In addition, a glass transition temperature (Tg) in Synthesis Examples 1 to 5 is a temperature calculated by the Fox formula described in the above specification.

Synthesis Example 1

(Preparing of Acrylic Polymer 1 Solution)

95 parts by weight of n-butyl acrylate (BA) and 5 parts by weight of acrylic acid (AA) as the monomer components and 150 parts by weight of ethyl acetate as a polymerization solvent were put into a separable flask and stirred for 1 hour while introducing nitrogen gas. In this manner, oxygen in the polymerization system was removed, and then 0.2 parts by weight of 2,2'-azobisisobutyronitrile (AIBN) as a polymerization initiator was added. A temperature was raised to 63° C. and a reaction was performed for 6 hours. Then, ethyl acetate was added to obtain an acrylic polymer 1 solution having a solid content concentration of 40% by weight. The weight average molecular weight of the acrylic polymer 1 in the acrylic polymer 1 solution was 5000000, and the glass transition temperature (Tg) when the acrylic polymer 1 was cured was −50° C.

Synthesis Example 2

(Preparing of Acrylic Polymer 2 Solution)

80 parts by weight of isononyl acrylate (iNA), 15 parts by weight of methoxyethyl acrylate (MEA), 5 parts by weight of acrylic acid (AA) as the monomer components and 150 parts by weight of ethyl acetate as the polymerization solvent were put into a separable flask and stirred for 1 hour while introducing nitrogen gas. In this manner, oxygen in the polymerization system was removed, and then 0.2 parts by weight of 2,2'-azobisisobutyronitrile as the polymerization initiator was added. A temperature was raised to 63° C. and a reaction was performed for 10 hours. Then, ethyl acetate was added to obtain an acrylic polymer 2 solution having a solid content concentration of 40% by weight. The weight average molecular weight of the acrylic polymer 2 in the acrylic polymer 2 solution was 600000, and the glass transition temperature (Tg) when the acrylic polymer 2 was cured was −55° C.

Synthesis Example 3

(Preparing of Acrylic Polymer 3 Solution)

80 parts by weight of n-butyl acrylate (BA), 15 parts by weight of vinyl acetate (VAc), 5 parts by weight of acrylic acid (AA) as the monomer components and 150 parts by weight of ethyl acetate as the polymerization solvent were put into a separable flask and stirred for 1 hour while introducing nitrogen gas. In this manner, oxygen in the polymerization system was removed, and then 0.2 parts by weight of 2,2'-azobisisobutyronitrile (AIBN) as the polymerization initiator was added. A temperature was raised to 63° C. and a reaction was performed for 10 hours. Then, ethyl acetate was added to obtain an acrylic polymer 3 solution having a solid content concentration of 40% by weight. The weight average molecular weight of the acrylic polymer 3 in the acrylic polymer 3 solution was 700000, and the glass transition temperature (Tg) when the acrylic polymer 3 was cured was −40° C.

Synthesis Example 4

(Preparing of Acrylic Polymer 4 Solution)

70 parts by weight of n-butyl acrylate (BA), 25 parts by weight of 2-ethylhexyl acrylate (2EHA), 5 parts by weight of acrylic acid (AA) as the monomer components and 150 parts by weight of ethyl acetate as the polymerization solvent were put into a separable flask and stirred for 1 hour while introducing nitrogen gas. In this manner, oxygen in the polymerization system was removed, and then 0.2 parts by weight of 2,2'-azobisisobutyronitrile (AIBN) as the polymerization initiator was added. A temperature was raised to 63° C. and a reaction was performed for 10 hours. Then, ethyl acetate was added to obtain an acrylic polymer 4 solution having a solid content concentration of 40% by weight. The weight average molecular weight of the acrylic polymer 4 in the acrylic polymer 4 solution was 700000, and the glass transition temperature (Tg) when the acrylic polymer 4 was cured was −54° C.

Synthesis Example 5

(Preparing of Acrylic Polymer 5 Solution)

97.1 parts by weight of n-butyl acrylate (BA), and 2.9 parts by weight of acrylic acid (AA) as the monomer components and 150 parts by weight of ethyl acetate as the polymerization solvent were put into a separable flask and stirred for 1 hour while introducing nitrogen gas. In this manner, oxygen in the polymerization system was removed, and then 0.2 parts by weight of 2,2'-azobisisobutyronitrile (AIBN) as the polymerization initiator was added. A temperature was raised to 63° C. and a reaction was performed for 6 hours. Then, ethyl acetate was added to obtain an acrylic polymer 5 solution having a solid content concentration of 32% by weight. The weight average molecular weight of the acrylic polymer 5 in the acrylic polymer 5 solution was 500000, and the glass transition temperature (Tg) when the acrylic polymer 5 was cured was −51° C.

Examples 1 to 14 and Comparative Example 1

The acrylic polymers 1 to 5 obtained in Synthesis Examples 1 to 5 and the respective ionic liquids were added in proportions shown in the following Table 1, stirred and mixed to obtain electrically peelable adhesive compositions.

The obtained electrically peelable adhesive composition was applied on a release treatment surface of a polyethylene terephthalate separator (trade name "MRF 38", manufactured by Mitsubishi Plastics) of which a surface was release-treated so as to have a thickness of 30 μm using an applicator to obtain the adhesive composition layer. Next, drying by heating was performed for 3 minutes at 130° C. to form the adhesive layer. Each adhesive layer (adhesive sheet) was obtained. The obtained each adhesive layer (adhesive sheet) was evaluated as follows. In the ionic liquids in Table 1, all the anions are FSI, and a unit of the mixing amount of the polymer and the ionic liquid is parts by weight. "-" in the evaluation of Table 1 indicates that the measurement was not carried out.

[Evaluation]

(Initial Adhesion Force)

The adhesive layer (adhesive sheet) was formed into a sheet having a size of 10 mm×80 mm, and a metal layer face of a film having a metal layer (trade name "BR 1075" manufactured by Toray Advanced Film Co., Ltd., thickness of 25 μm, and a size of 10 mm×100 mm) as a substrate was attached to a face without the separator to obtain a single-sided adhesive sheet having a substrate. A separator of the single-sided adhesive sheet having a substrate was peeled off, and a stainless steel plate (sus304, size: 30 mm×120 mm) as the adherend was pasted to the peeled face such that one end of the adhesive sheet protruded from the adherend by approximately 2 mm, and was pressed by reciprocating a 2 kg roller one time. After standing for 30 minutes, the joined body including a stainless steel plate 6/an adhesive layer (adhesive sheet) 1'/a film having a metal layer (conduction substrate) 5' outlined in FIG. 4 was obtained. Thereafter, an adhesion force in 180° peel test (tension rate: 300 mm/min and peeling temperature 23° C.) was measured using a peeling tester (trade name "Angle variable peeling measuring machine YSP" manufactured by ASAHI SEIKO CO., LTD.) by a method indicated by an arrow in FIG. 4.

(Electrical Peelability: Peel Strength after 10 Seconds from Voltage Stop and Adhesion Force Recovery Rate after 10 Seconds)

Figure 4:
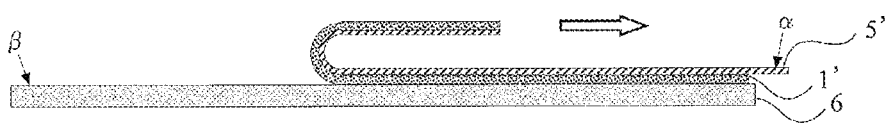
FIG. 4 is a sectional view showing an overview of a method of a 180° peel test according to an embodiment.

The joined body including the stainless steel plate 6/the adhesive layer (adhesive sheet) 1'/the film having a metal layer (conduction substrate) 5' outlined in FIG. 4 similarly to the initial adhesion force was produced. Electrodes of a cathode and an anode of a DC current machine were respectively attached to the joined body at the portions of α and β in FIG. 4 and the voltage was applied for 30 seconds at a voltage of 10 V. Thereafter, the electrodes were detached, and after 10 seconds passed, an adhesion force in 180° peel test (tension rate: 300 mm/min and peeling temperature 23° C.) was measured using the peeling tester by the method indicated by an arrow in FIG. 4. The measurement result was assumed as the peel strength [N/cm] after 10 seconds from voltage stop, and the result of [(Peel strength after 10 seconds from voltage stop/The initial adhesion force)×100] was assumed as the adhesion force recovery rate [%] after 10 seconds.

(Electrical Peelability: Peel Strength after 30 Seconds from Voltage Application)

The joined body the same as the above (electrical peelability: peel strength after 10 seconds from voltage stop and adhesion force recovery rate after 10 seconds) was produced, and a voltage was applied for 30 seconds at a voltage of 10 V. After 30 seconds (while applying a voltage) from voltage application, an adhesion force in 180° peel test (tension rate: 300 mm/min and peeling temperature 23° C.) was measured using the peeling tester by the method indicated by an arrow in FIG. 4, and the result thereof was assumed as the adhesion force [N/cm] after 30 seconds from voltage application. In Examples 12 to 14, a voltage was applied while dropping a few droplets of water to an interface between the stainless steel plate and the adhesive layer (adhesive sheet) with a dropper.

MP-471 . . . Cation: Formula (2-10) mentioned above, Anion: FSI, "ELEXCEL MP-471" (trade name, manufactured by DKS Co. Ltd.)

HMI-FSI . . . Cation: Formula (2-13) mentioned above, Anion: FSI, "HMI-FSI" (trade name, manufactured by Mitsubishi Materials Corporation)

AS-804 . . . Cation: Formula (2-14) mentioned above, Anion: FSI, "ELEXCEL AS-804" (trade name, manufactured by DKS Co. Ltd.)

As a summary of the above, a configuration of variations of the present invention are enumerated will be exemplified as Additions below.

(Appendix 1)

An electrically peelable adhesive composition including:
a polymer, and
an ionic liquid,

TABLE 1

| | | | Example | | | | | | | |
|---|---|---|---|---|---|---|---|---|---|---|
| | | | 1 | 2 | 3 | 4 | 5 | 6 | 7 | 8 |
| Polymer | Acrylic polymer 1 (BA/AA) | | 100 | 100 | 100 | 100 | 100 | 100 | 100 | 100 |
| | Acrylic polymer 2 (iNA/MEA/AA) | | | | | | | | | |
| | Acrylic polymer 3 (BA/VAc/AA) | | | | | | | | | |
| | Acrylic polymer 4 (BA/2EHA/AA) | | | | | | | | | |
| | Acrylic polymer 5 (BA/AA) | | | | | | | | | |
| Ionic Liquid | AS-110 | MW: 111 | 5 | | | 1 | 2 | 3 | 4 | 10 |
| | MP-442 | MW: 116 | | 5 | | | | | | |
| | MP-471 | MW: 158 | | | 5 | | | | | |
| | 1-Hexyl pyrrolidinium cation | MW: 164 | | | | | | | | |
| | HMI-FSI | MW: 169 | | | | | | | | |
| | AS-804 | MW: 209 | | | | | | | | |
| Evaluation | Initial adhesion force [N/cm] | | 1.3 | 1.6 | 2.3 | 1.63 | 2.07 | 1.86 | 1.91 | 1.89 |
| | Peel strength after 10 seconds from voltage stop [N/cm] | | 0.00 | 0.00 | 0.16 | — | — | — | — | — |
| | Adhesion force recovery rate after 10 seconds [%] | | 0 | 0 | 7 | — | — | — | — | — |
| | Peel strength after 30 seconds from voltage application [N/cm] | | 0.00 | — | — | 0.57 | 0.01 | 0.00 | 0.00 | 0.00 |

| | | | Example | | | | | | Comparative Example |
|---|---|---|---|---|---|---|---|---|---|
| | | | 9 | 10 | 11 | 12 | 13 | 14 | 1 |
| Polymer | Acrylic polymer 1 (BA/AA) | | | | | | 100 | 100 | 100 |
| | Acrylic polymer 2 (iNA/MEA/AA) | | 100 | | | | | | |
| | Acrylic polymer 3 (BA/VAc/AA) | | | 100 | | | | | |
| | Acrylic polymer 4 (BA/2EHA/AA) | | | | 100 | | | | |
| | Acrylic polymer 5 (BA/AA) | | | | | 100 | | | |
| Ionic Liquid | AS-110 | MW: 111 | 5 | 5 | 5 | | | | |
| | MP-442 | MW: 116 | | | | | | | |
| | MP-471 | MW: 158 | | | | | | | |
| | 1-Hexyl pyrrolidinium cation | MW: 164 | | | | | 5 | | |
| | HMI-FSI | MW: 169 | | | | | | 5 | |
| | AS-804 | MW: 209 | | | | 5 | | | |
| Evaluation | Initial adhesion force [N/cm] | | 3.35 | 2.47 | 2.17 | 1.7 | 2.4 | 1.8 | 3.37 |
| | Peel strength after 10 seconds from voltage stop [N/cm] | | — | — | — | — | — | — | — |
| | Adhesion force recovery rate after 10 seconds [%] | | — | — | — | — | — | — | — |
| | Peel strength after 30 seconds from voltage application [N/cm] | | 0.00 | 0.00 | 0.07 | 0.08 | 0.08 | 0.08 | 2.70 |

Abbreviations of the ionic liquid in Table 1 are as follows.

AS-110 . . . Cation: Formula (2-1) mentioned above, Anion: FSI, "ELEXCEL AS-110" (trade name, manufactured by DKS Co. Ltd.)

MP-442 . . . Cation: Formula (2-9) mentioned above, Anion: FSI, "ELEXCEL MP-442" (trade name, manufactured by DKS Co. Ltd.)

in which an anion of the ionic liquid is a bis(fluorosulfonyl)imide anion.

(Appendix 2)

The electrically peelable adhesive composition according to Appendix 1, in which a content of the ionic liquid is 0.5 to 30 parts by weight with respect to 100 parts by weight of the polymer.

(Appendix 3)
The electrically peelable adhesive composition according to Appendix 1 or 2,
in which a glass transition temperature of the polymer is 0° C. or lower.
(Appendix 4)
The electrically peelable adhesive composition according to any one of Appendixes 1 to 3,
in which the polymer is an acrylic polymer.
(Appendix 5)
The electrically peelable adhesive composition according to Appendix 4,
in which the acrylic polymer has a monomer unit derived from an alkyl (meth)acrylate having an alkyl group having 1 to 14 carbon atoms.
(Appendix 6)
The electrically peelable adhesive composition according to Appendix 4 or 5,
in which the acrylic polymer has a monomer unit derived from alkyl (meth)acrylate having an alkyl group having 1 to 14 carbon atoms and a monomer unit derived from a polar group-containing monomer.
(Appendix 7)
The electrically peelable adhesive composition according to Appendix 6,
in which the polar group-containing monomer is a carboxyl group-containing monomer.
(Appendix 8)
The electrically peelable adhesive composition according to Appendix 7,
in which the carboxyl group-containing monomer is acrylic acid.
(Appendix 9)
The electrically peelable adhesive composition according to any one of Appendixes 5 to 8,
in which the alkyl (meth)acrylate having an alkyl group having 1 to 14 carbon atoms is butyl (meth)acrylate.
(Appendix 10)
The electrically peelable adhesive composition according to any one of Appendixes 1 to 9,
in which at least one selected from the group consisting of a nitrogen-containing onium cation, a sulfur-containing onium cation, and a phosphorus-containing onium cation is contained as a cation of the ionic liquid.
(Appendix 11)
The electrically peelable adhesive composition according to any one of Appendixes 1 to 10,
in which at least one selected from the group consisting of an imidazolium-based cation, ammonium-based cation, and a pyridinium-based cation is contained as a cation of the ionic liquid.
(Appendix 12)
The electrically peelable adhesive composition according to any one of Appendixes 1 to 11,
in which at least one cation selected from Formulas (2-A) to (2-D) below is contained as a cation of the ionic liquid.

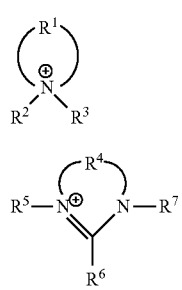

(2-A)

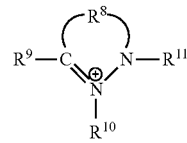

(2-B)

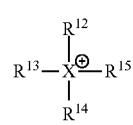

(2-C)

(2-D)

$R^{13}-X^{\oplus}-R^{15}$ with $R^{12}$ above and $R^{14}$ below

[In Formula (2-A), $R^1$ represents a hydrocarbon group having 4 to 10 carbon atoms and may contain a hetero atom, and $R^2$ and $R^3$ are the same as or different from each other, represent a hydrogen atom or a hydrocarbon group having 1 to 12 carbon atoms, and may also contain a hetero atom. Where, in a case where a nitrogen atom forms a double bond with an adjacent carbon atom, there is no $R^3$. In Formula (2-B), $R^4$ represents a hydrocarbon group having 2 to 10 carbon atoms and may contain a hetero atom, and $R^5$, $R^6$, and $R^7$ are the same as or different from each other, represent a hydrogen atom or a hydrocarbon group having 1 to 12 carbon atoms, and may also contain a hetero atom. In Formula (2-C), $R^8$ represents a hydrocarbon group having 2 to 10 carbon atoms and may contain a hetero atom, and $R^9$, $R^{10}$, and $R^{11}$ are the same as or different from each other, represent a hydrogen atom or a hydrocarbon group having 1 to 16 carbon atoms, and may also contain a hetero atom. In Formula (2-D), X represents a nitrogen atom, a sulfur atom, or a phosphorus atom, and $R^{12}$, $R^{13}$, $R^{14}$, and $R^{15}$ are the same as or different from each other, represent a hydrocarbon group having 1 to 16 carbon atoms, and may also contain a hetero atom. Where, in a case where X is a sulfur atom, there is no $R^{12}$.]
(Appendix 13)
The electrically peelable adhesive composition according to any one of Appendixes 1 to 10,
in which a molecular weight of the cation of the ionic liquid is 250 or less.
(Appendix 14)
An adhesive sheet including a first adhesive layer that is formed of the electrically peelable adhesive composition according to any one of Appendixes 1 to 13.
(Appendix 15)
The adhesive sheet according to Appendix 14,
in which the adhesive layer has a thickness of 1 μm or more and 1000 μm or less.
(Appendix 16)
The adhesive sheet according to Appendix 14 or 15,
in which the adhesive sheet is a double-sided adhesive sheet not including a substrate layer.
(Appendix 17)
The adhesive sheet according to any one of Appendixes 14 to 16,
in which at least one adherend is a conductive adherend.
(Appendix 18)
The adhesive sheet according to any one of Appendixes 14 to 17,
in which at least one adherend is a non-conductive adherend, and
the adhesive sheet has a laminate structure including a second adhesive layer not including an ionic liquid, a conductive layer, and the first adhesive layer in order.

(Appendix 19)

A double-sided adhesive sheet having a laminate structure including a first adhesive layer which is formed of the electrically peelable adhesive composition according to any one of Appendixes 1 to 13, a second adhesive layer not including an ionic liquid, and a voltage applying conductive layer which is disposed between the first adhesive layer and the second adhesive layer and is electrically connected to the first adhesive layer.

(Appendix 20)

The double-sided adhesive sheet according to Appendix 19, in which the laminate structure includes a substrate for supporting the conductive layer.

(Appendix 21)

A double-sided adhesive sheet having a laminate structure including a first adhesive layer which is formed of the electrically peelable adhesive composition according to any one of Appendixes 1 to 13, a second adhesive layer not including an ionic liquid, a pair of a first conductive layer and a second conductive layer which are disposed between the first adhesive layer and the second adhesive layer and are for applying a voltage, and a third adhesive layer which is disposed between the first adhesive layer and the second adhesive layer, is electrically connected to the first and second adhesive layers, and contains an ionic liquid.

(Appendix 22)

A joined body having at least a laminate structure including a conductive adherend and the adhesive sheet according to any one of Appendixes 14 to 18.

(Appendix 23)

A joined body having a laminate structure including one conductive adherend, the adhesive sheet according to any one of Appendixes 14 to 18, and the other conductive adherend.

REFERENCE SIGNS LIST

X1, X2, and X3 Adhesive sheet
1 Adhesive layer (of the present invention)
2 (Another) Adhesive layer
3 Substrate
4 Conductive layer
5 Conduction substrate

The invention claimed is:

1. An adhesive sheet comprising:
an adhesive layer that is formed of an electrically peelable adhesive composition, and a conduction substrate comprising a substrate and a conductive layer,
wherein the electrically peelable adhesive composition comprises:
a polymer dissolved in an organic solvent;
the organic solvent; and
an ionic liquid,
wherein an anion of the ionic liquid is a bis(fluorosulfonyl)imide anion, and
wherein an adhesion force of the adhesive layer 10 seconds after a voltage being applied to the adhesive layer stops is 1.0 N/cm or less.

2. The adhesive sheet according to claim 1,
wherein a content of the ionic liquid is 0.5 to 30 parts by weight with respect to 100 parts by weight of the polymer.

3. The adhesive sheet according to claim 1,
wherein a glass transition temperature of the polymer is 0° C. or lower.

4. The adhesive sheet according to claim 1,
wherein the polymer is an acrylic polymer.

5. The adhesive sheet according to claim 4,
wherein the acrylic polymer has a monomer unit derived from an alkyl (meth)acrylate having an alkyl group having 1 to 14 carbon atoms.

6. The adhesive sheet according to claim 5,
wherein the alkyl (meth)acrylate having an alkyl group having 1 to 14 carbon atoms is butyl (meth)acrylate.

7. The adhesive sheet according to claim 4,
wherein the acrylic polymer has a monomer unit derived from alkyl (meth)acrylate having an alkyl group having 1 to 14 carbon atoms and a monomer unit derived from a polar group-containing monomer.

8. The adhesive sheet according to claim 7,
wherein the polar group-containing monomer is a carboxyl group-containing monomer.

9. The adhesive sheet according to claim 1,
wherein at least one selected from the group consisting of a nitrogen-containing onium cation, a sulfur-containing onium cation, and a phosphorus-containing onium cation is contained as a cation of the ionic liquid.

10. The adhesive sheet according to claim 1, wherein at least one cation selected from Formulas (2-A) to (2-D) below is contained as a cation of the ionic liquid:

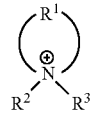

(2-A)

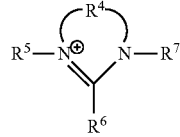

(2-B)

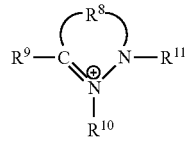

(2-C)

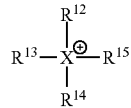

(2-D)

$R^1$ in Formula (2-A) represents a hydrocarbon group having 4 to 10 carbon atoms and may contain a hetero atom, and $R^2$ and $R^3$ are the same as or different from each other, represent a hydrogen atom or a hydrocarbon group having 1 to 12 carbon atoms, and may also contain a hetero atom, where in a case where a nitrogen atom described in Formula (2-A) forms a double bond with an adjacent carbon atom, there is no $R^3$;

$R^4$ in Formula (2-B) represents a hydrocarbon group having 2 to 10 carbon atoms and may contain a hetero atom, and $R^5$, $R^6$, and $R^7$ are the same as or different from each other, represent a hydrogen atom or a hydrocarbon group having 1 to 12 carbon atoms, and may also contain a hetero atom;

$R^8$ in Formula (2-C) represents a hydrocarbon group having 2 to 10 carbon atoms and may contain a hetero atom, and $R^9$, $R^{10}$, and $R^{11}$ are the same as or different from each other, represent a hydrogen atom or a hydrocarbon group having 1 to 16 carbon atoms, and may also contain a hetero atom; and X in Formula (2-D) represents a nitrogen atom, a sulfur atom, or a phosphorus atom, and $R^{12}$, $R^{13}$, $R^{14}$, and $R^{15}$ are the same as or different from each other, represent a hydrocarbon group having 1 to 16 carbon atoms, and may also contain a hetero atom, where, in a case where X is a sulfur atom, there is no $R^{12}$.

11. The adhesive sheet according to claim 1, wherein a molecular weight of the cation of the ionic liquid is 250 or less.

12. The adhesive sheet according to claim 1, wherein the adhesive layer has a thickness of 1 μm or more and 1000 μm or less.

13. The adhesive sheet according to claim 1, wherein am amount of the organic solvent ranges from 10 parts by weight to 1000 parts by weight based on 100 parts by weight of a total monomer components forming the polymer.

14. A joined body having at least a laminate structure, comprising:
   a conductive adherend; and
   the adhesive sheet according to claim 1.

15. A joined body having a laminate structure, comprising:
   a first conductive adherend;
   the adhesive sheet according to claim 1; and
   a second conductive adherend.

\* \* \* \* \*